US012618439B2

(12) United States Patent
    Dietl et al.

(10) Patent No.: US 12,618,439 B2
(45) Date of Patent: May 5, 2026

(54) BEARING ELEMENT FOR A BEARING UNIT, AND BEARING UNIT WITH AN INCREASED LIFE

(71) Applicant: AKTIEBOLAGET SKF, Gothenburg (SE)

(72) Inventors: Paul Dietl, Stephanshart (AT); Xiaobo Zhou, Houten (NL)

(73) Assignee: AKTIEBOLAGET SKF, Gothenburg (SE)

( * ) Notice: Subject to any disclaimer, the term of this patent is extended or adjusted under 35 U.S.C. 154(b) by 128 days.

(21) Appl. No.: 18/134,083

(22) Filed: Apr. 13, 2023

(65) Prior Publication Data

US 2023/0340996 A1      Oct. 26, 2023

(30) Foreign Application Priority Data

Apr. 22, 2022    (FR) ...................................... 2203737

(51) Int. Cl.
    *F16C 33/66*        (2006.01)
    *F16C 19/06*        (2006.01)
(52) U.S. Cl.
    CPC .......... *F16C 33/6696* (2013.01); *F16C 19/06* (2013.01); *F16C 2223/30* (2013.01)
(58) Field of Classification Search
    CPC ... F16C 2223/30; F16C 33/6696; F16C 19/06
    See application file for complete search history.

(56) References Cited

U.S. PATENT DOCUMENTS

| | | | | |
|---|---|---|---|---|
| 2,969,264 | A * | 1/1961 | Lamson .............. | F16C 33/6696 |
| | | | | 384/491 |
| 4,293,171 | A | 10/1981 | Kakumoto et al. | |
| 5,282,985 | A * | 2/1994 | Zabinski .............. | C10M 125/04 |
| | | | | 508/156 |
| 12,404,474 | B1 * | 9/2025 | Dugger ............... | C23C 14/0623 |
| 2002/0051596 | A1 * | 5/2002 | Yamamoto .......... | F16C 33/6696 |
| | | | | 384/527 |

(Continued)

FOREIGN PATENT DOCUMENTS

| | | | |
|---|---|---|---|
| EP | 1470343 | B1 | 9/2005 |
| JP | 2005147306 | A | 6/2005 |

(Continued)

OTHER PUBLICATIONS https://plasmaterials.com/converting-atomic-percent-to-weight-percent-and-vice-versa/ (Year: 2024).*

(Continued)

*Primary Examiner* — Paul N Dickson
*Assistant Examiner* — Aimee Tran Nguyen
(74) *Attorney, Agent, or Firm* — J-TEK LAW PLLC; Scott T. Wakeman; Mark A. Ussai

(57)                ABSTRACT

A bearing element of a bearing unit includes a substrate, a first coating on the substrate and a second coating on the first coating. The first coating is configured to increase a wear resistance of the substrate and includes a first solid lubricant, and the second coating is softer than the first coating and includes a second solid lubricant. The solid lubricants of the first and second coatings may be $MoS_2$, and the first coating may include between 3 and 30 at % Ti.

17 Claims, 1 Drawing Sheet

(56)     References Cited

U.S. PATENT DOCUMENTS

| | | | | |
|---|---|---|---|---|
| 2002/0077186 A1* | 6/2002 | Hosoya | ................. | F16C 33/445 |
| | | | | 464/145 |
| 2005/0213860 A1* | 9/2005 | Zhou | .................... | F16C 33/303 |
| | | | | 384/492 |
| 2020/0232508 A1* | 7/2020 | Plioska | .................. | F16C 27/02 |

FOREIGN PATENT DOCUMENTS

| | | | | | | |
|---|---|---|---|---|---|---|
| JP | 2006200733 | A | * | 8/2006 | ............ | F16C 33/585 |
| JP | 2008221982 | A | * | 9/2008 | | |
| WO | 03064874 | A1 | | 8/2003 | | |

OTHER PUBLICATIONS

Office Action and Search Report from the French Patent Office dispatched Nov. 10, 2022 in related application No. FR2203737, and translation thereof.

* cited by examiner

BEARING ELEMENT FOR A BEARING UNIT, AND BEARING UNIT WITH AN INCREASED LIFE

CROSS-REFERENCE

This application claims priority to French patent application no. 2203737 filed on Apr. 22, 2022, the contents of which are fully incorporated herein by reference.

TECHNOLOGICAL FIELD

The disclosure is directed to a bearing element, in particular, a rolling-element bearing, of a bearing unit and to a bearing unit including the bearing element.

BACKGROUND

In some applications, for instance in a vacuum, it is not possible or desirable to use grease or oil to lubricate a contact area of a bearing unit, for instance a contact between a rolling element and a raceway or a cage. In such circumstances it is known to use a solid lubricant such as graphite or molybdenum disulfide $MoS_2$ in order to lubricate a contact area.

In order to reduce the resistance to the wear of a contact area and at the same time provide a solid lubricant in the contact area, it is known from EP 1 470 343 B1 (family member of US 2005/213860) to coat an element of a bearing unit with a hard solid lubricant comprising metal doped $MoS_2$. However, further improvements are still possible.

SUMMARY

An aspect of the disclosure is to provide a bearing element of a bearing unit having a longer service life thanks to a combination of an increased resistance to wear and an increased ability to lubricate a contact surface between the bearing element and another bearing element.

The bearing element comprises a substrate and a first coating for increasing the wear resistance of the substrate. The first coating is applied on the substrate and comprises a solid lubricant.

The bearing element comprises a second coating which is softer than the first coating.

The second coating is applied on the first coating and comprises a solid lubricant.

According to further aspects of the disclosure which are advantageous but not compulsory, such a bearing element may incorporate one or several of the following features:
- the solid lubricant of the first and second coatings is $MoS_2$;
- the first coating comprises Ti, the content of which is between 3 and 30 at %;
- the first coating has a hardness between 750 and 2500 HV;
- the first coating has a thickness between 0.2 and 4 micron;
- the solid lubricant of the second coating has a content between 20 and 60 at %;
- the second coating further comprises an adhesive or a binder such as epoxy;
- the hardness of the second coating is below 150 HV;
- the first coating comprises a bonding layer which is first applied on the substrate.

Another aspect of the disclosure comprises a bearing element of a bearing unit, where the bearing unit comprises a substrate, a first coating on the substrate, the first coating being configured to increase a wear resistance of the substrate and comprising a first solid lubricant, and a second coating on the first coating, the second coating being softer than the first coating and comprising a second solid lubricant. Furthermore, the first coating consists essentially of MoS2 and 3 to 30 at % Ti and has a hardness between 750 and 2500 HV, and the second coating consists essentially of MoS2 and has a hardness of less than 150 HV.

Another aspect of the disclosure is a bearing unit comprising a bearing element according to the disclosure. The bearing element can be for instance a ring, a rolling element, a cage, a separator or a spacer. The disclosed coating increases the life of the bearing unit, especially when the bearing unit runs in severe or extreme conditions in terms of acceleration, speed, loading or temperature.

BRIEF DESCRIPTION OF THE DRAWINGS

Embodiments of the invention will now be explained in connection with the annexed figures, as illustrative examples, without restricting the scope of the invention. In the annexed figures.

DETAILED DESCRIPTION

The bearing unit according to the disclosure comprises an inner ring and an outer ring. The inner and outer rings are rotatable with respect to each other along a common rotational axis.

In a preferred embodiment, the bearing unit is a plain bearing so that the inner and outer rings are in direct sliding contact with each other when one rotates relative to the other.

In another preferred embodiment, the bearing unit further comprises rolling elements between the inner and outer rings.

In another preferred embodiment, the bearing unit further comprises a cage (in one or several adjacent parts) for holding the rolling elements at a predetermined relative position with respect to each other.

In another preferred embodiment, the bearing unit further comprises a plurality of spacers, each spacer separating two adjacent rolling element.

In another preferred embodiment, the bearing unit is a full complement bearing, with rolling elements between the inner and the outer rings, but without any cage or spacer for separating the rolling elements.

In a preferred embodiment, the rolling elements are balls. Alternatively, the rolling elements may be rollers, such as cylindrical rollers, tapered rollers, toroidal rollers or barrel rollers.

Figure 1:
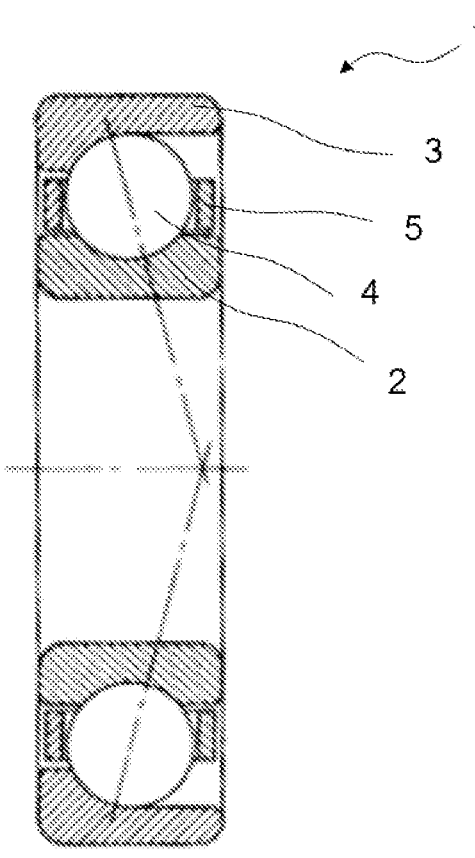
FIG. 1 is a longitudinal cross section of a bearing unit according to an embodiment of the present disclosure.

FIG. 1 illustrates a bearing unit 1 comprising an inner ring 2, an outer ring 3, rolling elements in the form of balls 4 located between the inner and outer rings, and a cage 5 for holding the balls in position at a uniform distance in the circumferential direction.

Figure 2:
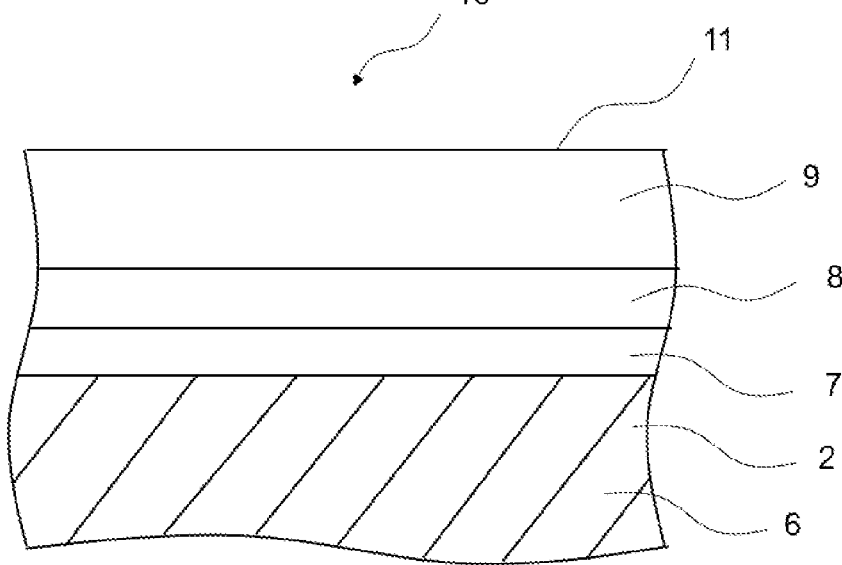
FIG. 2 is a schematic detail view of part of a bearing element of the bearing unit of FIG. 1.

FIG. 2 illustrates a partial view of a bearing element 10. The bearing element 10 has a surface 11 intended to come into contact with another bearing element. The surface may be, for example, a raceway of the inner ring 2 or the outer ring 3 or one of the balls 4.

The bearing element according to the disclosure comprises a substrate 6 and first coating 8 which increases the wear resistance of the substrate. The first coating is applied on the substrate and comprises a solid lubricant.

In order to increase the resistance to the wear of the bearing element in the area where the first coating is applied, the hardness of the first coating is greater than the hardness of the substrate in that area.

The bearing element according to the disclosure is for instance a ring, such as an inner ring or an outer ring, or a bushing. The bearing element can also be a rolling element such as a ball or a roller. The bearing element can also be a cage for maintaining a plurality rolling elements at a predetermined distance from each other, or a spacer to be positioned between two consecutive rolling elements.

In a preferred embodiment of the bearing unit, the bearing unit comprises a plurality of bearing elements according to the disclosure.

In a preferred embodiment of the bearing unit, the bearing unit comprises an inner ring, an outer ring and rolling elements made from ceramic material, and the bearing element according to the disclosure is the inner ring, and the double coating is applied on the raceway of the inner ring where the rolling elements can travel.

In another preferred embodiment of the bearing unit, the bearing unit comprises an inner ring, an outer ring and rolling elements made from metallic material, and the double coating is applied on the raceway of the inner ring and on the rolling elements.

In a preferred embodiment, the substrate is made from a bearing steel. Alternatively, the substrate may be made from a ceramic material such as $Si_3N_4$, or a plastic material such as PEEK or PA6.6.

In a preferred embodiment of the disclosure, the lubricant of the first coating comprises $MoS_2$. Advantageously, the lubricant of the first coating is only made of $MoS_2$. If so, the $MoS_2$ is preferably antimony-free. Alternatively, or in complement, the lubricant of the first coating comprises or is exclusively made of $WS_2$ or DLC.

In a preferred embodiment of the disclosure, the first coating comprises a doping metal such as Ti or Mo. Advantageously, the doping metal is Ti only.

In a preferred embodiment, the first coating comprises $MoS_2$ and Ti, and the content of Ti is between 3 and 30% at, and preferably between 5 and 15 at %.

In a preferred embodiment, the thickness of the first coating is between 0.2 and 4 micron, and preferably between 0.5 and 2 microns.

In a preferred embodiment, the hardness of the first coating is between 700 and 2500 HV, and preferably between 1000 and 1500 HV.

Advantageously, the first layer is applied by plasma deposition, preferably by PVD (Physical Vapor Deposition). The depositing is realized on the finished bearing element, and no further machining such as grinding or honing, or heat treatment is done on the bearing element after the depositing.

If the first coating comprises a doping metal, the coating is realized in a number of layers. Some layers comprise mainly the doping metal (e.g. Ti), and others mainly the solid lubricant (e.g. $MoS_2$). Advantageously, the last layer is made of pure solid lubricant.

In a preferred embodiment, the first coating further comprises a bonding layer 7 first applied on the substrate. The bonding layer increases the anchorage of the first coating to the substrate. Advantageously, the bonding layer may be made from pure Ti (elemental titanium).

The bearing element 10 further comprises a second coating 9. The second coating is applied on the first coating. The second coating is softer than the first coating, that is the hardness of the second coating is less than the hardness of the first coating. The second coating comprises a solid lubricant.

In a preferred embodiment of the disclosure, the lubricant of the second coating comprises $MoS_2$. Advantageously, the lubricant of the second coating is only MoS2. Alternatively, the lubricant of the second coating may be WS2 or DLC.

In a preferred embodiment of the disclosure, the second coating consists essentially of a solid lubricant. In another preferred embodiment, the second coating also comprises an adhesive or a binder such as an epoxy. Advantageously, the second coating has a hardness below 150 HV.

Because the second coating is much softer than the first one, it is smeared back by plastic deformation during operation (rotation); this phenomenon provides to the bearing element a passive self-healing property.

Advantageously, the top layer of the first coating is porous, which increases the anchorage of the second coating to the first coating. Cavities of a few microns in size suffice to ensure an efficient gripping.

Preferably, the second layer is obtained by applying (e.g., by painting) a mixture obtained by mixing a powder of solid lubricant and a liquid solvent which will evaporate so as to leave pure solid lubricant. Advantageously, the mixture further comprises an adhesive or a binder such as epoxy which will improve the anchorage of the second coating to the first coating.

Alternatively, the second coating is obtained by spraying an aerosol comprising a powder of solid lubricant, a liquid solvent and optionally an adhesive or a binder.

Thanks to the disclosure, the resistance to the wear of the bearing element and the bearing unit is improved, and at the same time the lubrication conditions are improved.

Also, thanks to the disclosure, when the bearing element or the bearing unit is used in extreme conditions, for instance when submitted to very high rotational accelerations and/or speeds, or very high or sudden loads, the life of the bearing is increased in comparison to traditional bearings.

The disclosure is therefore well adapted for ball bearings used as landing bearings in magnetic bearing systems.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing elements.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1 bearing unit
2 inner ring
3 outer ring
4 rolling element
5 cage
6 substrate
7 bonding layer
8 first coating
9 second coating
10 bearing element
11 surface

What is claimed is:

1. A bearing element of a bearing unit, comprising:
a substrate,
a first coating on the substrate, the first coating being configured to increase a wear resistance of the substrate and comprising a first solid lubricant, and
a second coating on the first coating, the second coating being softer than the first coating and comprising a second solid lubricant,
wherein the first solid lubricant and the second solid lubricant each comprise $MoS_2$.

2. The bearing element according to claim 1,
wherein the first coating comprises Ti.

3. The bearing element claim 2,
wherein the first coating has a hardness between 750 and 2500 HV.

4. The bearing element according to claim 3,
wherein the first coating has a thickness between 0.2 and 4 micron.

5. The bearing element according to claim 3,
wherein the second coating further comprises an adhesive or a binder.

6. The bearing element according to claim 5,
wherein a hardness of the second coating is less than 150 HV.

7. The bearing element according to claim 6,
including a bonding layer between the substrate and the first coating.

8. The bearing element according to claim 3,
wherein the second coating further comprises an epoxy.

9. A bearing unit comprising at least one bearing element according to claim 1,
wherein the bearing element is a ring, a rolling element, a cage, a separator, or a spacer.

10. The bearing element according to claim 1,
wherein the first coating comprises $MoS_2$ and Ti and has a hardness between 750 and 2500 HV, and
wherein the second coating comprises $MoS_2$ and has a hardness of less than 150 HV.

11. The bearing element according to claim 10,
wherein the second coating consists essentially of $MoS_2$ and an epoxy.

12. The bearing element according to claim 1,
wherein the first coating consists essentially of $MoS_2$ and Ti and has a hardness between 750 and 2500 HV, and
wherein the second coating consists essentially of $MoS_2$ and has a hardness of less than 150 HV.

13. The bearing element according to claim 12,
including a bonding layer between the substrate and the first coating.

14. The bearing element according to claim 12,
wherein the first coating is formed of a plurality of alternating first layers consisting essentially of titanium and second layers consisting essentially of $MoS_2$.

15. The bearing element according to claim 1,
wherein the substrate comprises PEEK or PA6.6.

16. The bearing element according to claim 1,
wherein the substrate comprises a ceramic material.

17. The bearing element according to claim 1,
wherein the substrate comprises a bearing steel.

* * * * *